United States Patent

Hegedus et al.

Patent Number: 5,491,185
Date of Patent: * Feb. 13, 1996

[54] EPOXY SELF-PRIMING TOPCOATS

[75] Inventors: Charles R. Hegedus, Coopersburg, Pa.; Donald J. Hirst, Mt. Laurel; Anthony T. Eng, Cherry Hill, both of N.J.

[73] Assignee: The United States of America as represented by the Secretary of the Navy, Washington, D.C.

[*] Notice: The portion of the term of this patent subsequent to Apr. 13, 2010, has been disclaimed.

[21] Appl. No.: 207,448

[22] Filed: Mar. 7, 1994

Related U.S. Application Data

[63] Continuation-in-part of Ser. No. 62,864, May 14, 1993, Pat. No. 5,308,903.

[51] Int. Cl.⁶ ............................................. C08L 63/00
[52] U.S. Cl. ........................ 523/451; 523/455; 524/204; 524/396; 524/399; 524/417; 427/385.5; 427/388.1; 427/388.5; 427/407.1
[58] Field of Search .................................. 524/204, 396, 524/399, 417; 427/385.5, 388.1, 388.5, 407.1; 523/451, 455

[56] References Cited

U.S. PATENT DOCUMENTS

| | | | |
|---|---|---|---|
| 4,003,867 | 1/1977 | Cooper et al. | 523/451 |
| 4,352,899 | 10/1982 | Tada et al. | 523/451 |
| 4,605,570 | 8/1986 | Felter et al. | 523/451 |
| 4,943,604 | 7/1990 | Okuri et al. | 523/451 |
| 5,059,640 | 10/1991 | Hegedus et al. | 523/451 |
| 5,202,367 | 4/1993 | Hegedus et al. | 524/204 |
| 5,274,021 | 12/1993 | Geeck et al. | 524/417 |
| 5,362,775 | 11/1994 | Shintai et al. | 523/451 |

*Primary Examiner*—Paul R. Michl
*Assistant Examiner*—Duc Truong
*Attorney, Agent, or Firm*—James V. Tura; Susan E. Verona

[57] ABSTRACT

A corrosion-resistant coating which can be applied directly to a surface as a self-priming topcoat comprising an epoxy resin binder and a combination of pigments consisting essentially of an aluminum triphosphate, zinc salts of benzoic acids, and an alkaline earth metal phosphate such as zinc-barium phosphate. In addition, the coating contains up to about 30 parts by weight of a titanium dioxide pigment, up to about 2.0 parts by weight of an oil soluble surface active agent and up to about 50 parts by weight of at least one organic paint solvent.

10 Claims, No Drawings

EPOXY SELF-PRIMING TOPCOATS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of application Ser. No. 08/062,864 filed May 14, 1993, now U.S. Pat. No. 5,308,903.

BACKGROUND OF THE INVENTION

This invention relates to novel coating compositions and more specifically to corrosion-resisting coatings which can be applied directly to various surfaces particularly metal either as a high or low gloss, self-priming topcoat.

Various surfaces and particularly metal surfaces require the protection of coatings especially when the surfaces are exposed to a corrosive environment. Metal surfaces of aircraft, for example, are exposed to seawater which require protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used need protection against corrosion. It is important therefore that the coating be resistant to corrosion, various chemicals, the weather and at the same time be flexible and have good adhesion to the substrates.

Presently, coating systems comprise one or more films, i.e., an undercoat, a sealant and a topcoat. Aircraft, for example, traditionally have been coated with high performance two-component protective films consisting of an epoxy primer and a polyurethane topcoat. The type of epoxy primers used on the aircraft are designed to adhere to the metal surface and help to improve the adhesion of the topcoat and together prevent corrosion of the metal. However, these undercoats require a topcoat, since the undercoats lack flexibility especially at low temperatures (–60° F.) resulting in extensive cracking particularly in highly flexed areas of the aircraft. In addition, the undercoats usually lack weather resistance and generally cannot be formulated in different colors required for aircraft.

The epoxy coating compositions of this invention, however, provides the necessary corrosion resistance, the required degree of flexibility, the desired optical properties, and the needed resistance to weather and various chemicals. To obtain all of these characteristics, however, the multi-film coatings used heretofore generally required a dry-film thickness ranging up to about 0.005 inches, e.g., up to about 10 mils or more which add considerable weight to the aircraft. In addition, the multi coats are time consuming to apply particularly since there is a drying time between each application. Further, the removal of a multi-coat system can be difficult and time consuming and generates high levels of volatile organic (VOC) emissions during the operations.

In accordance with this invention, the corrosion-resistant coating comprise an epoxy resin binder in combination with a unique mixture of corrosion-inhibiting pigments consisting essentially (1) of an alkaline earth metal phosphate, e.g., zinc-barium phosphate, (2) zinc salts of benzoic acid or substituted benzoic acid, and (3) an aluminum triphosphate. All three of these compounds are essential, in the stated relative proportions, to provide a single coating with the necessary corrosion resistance and adhesion characteristics required of a high performance coating. In addition, titanium dioxide ($TiO_2$) including spherical $TiO_2$ particles, e.g., vesiculated beads of $TiO_2$ is included as a pigment together with these three metal compounds. The coating compositions of this invention may be applied, as one coat, directly onto various hard surfaces such as metal and do not require an undercoat to provide a corrosion-resistant finish with the desired optical and adhesion properties.

SUMMARY OF THE INVENTION

A corrosion-resistant coating which can be applied directly to a surface as a self-priming topcoat comprising from about 15 to 50 parts by weight and preferably 20–40 parts of an epoxy resin binder and a combination of three corrosion-resistant pigments consisting essentially of aluminum triphosphates, zinc salts of benzoic acid, and alkaline earth metal or zinc phosphates such as zinc-barium phosphates, together with oil soluble surface active agents, $TiO_2$ pigment, and organic paint solvents.

Accordingly, it is an object of this invention to provide a corrosion-resistant coating which can be applied directly to a surface e.g., metal, as a single coating.

It is another object of this invention to provide a coating which is flexible, resistant to corrosion, chemicals, and weathering, and has good adhesion characteristics.

It is still a further object of this invention to provide a coating for use on military or civilian aircraft of reduced thickness to lower the weight thereon while at the same time providing the necessary corrosion resistance.

These and other objects of the invention are accomplished, in accordance with this invention, by providing a corrosion-resistant coating capable of being applied as a single coat with appropriate optical properties.

THE PREFERRED EMBODIMENTS

This invention is directed to a corrosion-resistant coating which functions as a primer and a topcoat. More specifically, this invention relates to a corrosion-resistant coating which comprises from about 15 to 50 parts or 20 to 40 parts by weight of the total coating of an epoxy resin binder, and a combination of corrosion-inhibiting pigments. The unique combination of pigments consist essentially of from about 1 to 30 parts and preferably 5 to 25 parts by weight of an alkaline earth metal phosphate, e.g., zinc or zinc-barium phosphate, 0.1 to 5 parts and preferably 0.5 to 2.0 parts by weight of a zinc salt of a benzoic acid or substituted benzoic acid, and about 1 to 25 parts and preferably 5 to 20 parts by weight of aluminum triphosphate. In addition to the above metal compounds, depending on the opacity, etc., required of the coating, from 1 to 30 parts, and preferably from 5 to 25 parts by weight of titanium dioxide pigment, based on the total weight of the coating, may be added as an additional pigment. Up to about 100% of the total amount of $TiO_2$ may be in the form of vesiculated beads, e.g., from 0 to 10% of the $TiO_2$ in the coating are beads. Generally, the coating is applied as a high solids organic solution and therefore comprises from 0 to 2.0 and preferably 0.1 to 0.5 parts by weight of at least one oil soluble nonionic or anionic surface active agents and from about 0 to 50 parts, e.g. from 15 to 35 parts by weight of the total coating of at least one organic solvent, e.g., Mil-T-81772 or various mixtures of paint solvents.

The combination of metal compounds, i.e., salts and/or pigments is unique and consists essentially of specific amounts of an alkaline earth metal phosphate, e.g., zinc phosphate or zinc-barium phosphate etc., zinc salts of benzoic acid or a substituted benzoic acid and aluminum triphosphate. These three metal compound pigments used alone or in combination with $TiO_2$ provide outstanding corrosion protection and enables the coating to be used as a self-priming, high or low-gloss topcoat.

The preferred zinc salts of the benzoic acids have at least one hydroxyl substituent and one ($NO_2$) group. The zinc salts of the benzoic acids are further characterized as having molecular weights of approximately 100 to 500. The preferred zinc phosphates, e.g., zinc-barium phosphate are available as Phos-Plus (J0866) from Mineral Pigments Corporation. The aluminum triphosphates are available as K-White. In addition to utilizing the above combination of pigments in the required ratios, other known pigments particularly titanium dioxide is added to the coating to provide reinforcing strength and to add color, or improve hiding and opacity of the coating. Other additives that may be used include tinting or coloring agents which may be added to the coating in small but effective amounts including carbon black, zinc oxide, antimony oxides, barium sulfate, calcium carbonate and one or more of the organic pigments such as the phthalocyanine colors e.g. greens or blues, etc.

Specifically, the corrosion resistant coatings of this invention can be prepared by milling the ingredients set forth in the following Examples.

| Ingredients | EXAMPLE 1 Parts by Weight (Ranges) | EXAMPLE 2 Parts by Weight (Ranges) |
| --- | --- | --- |
| Epoxy Resin (EPON-1513 to VERSAMID 1540 ratio about 1.8 to 1.0 by weight) | 15–50 | 20–40 |
| Titanium dioxide | 1–30 | 5–25 |
| Titanium dioxide vesiculated beads | 0–30 | 0–5 |
| Alkaline earth metal phosphates (zinc and/or barium phosphates) | 1–30 | 5–25 |
| Zinc salts of substituted benzoic acids | 0.1–5 | 0.5–2.0 |
| Aluminum Triphosphate | 1–25 | 5–20 |
| Surface active agents | 0–2.0 | 0.1–0.5 |
| Organic solvents for paints | 0–50 | 15–35 |

| EXAMPLE 3 | |
| --- | --- |
| Ingredients | Parts by Weight |
| Epoxy Resin | 25.4 |
| Titanium Dioxide | 8.0 |
| Titanium Dioxide Vesiculated Beads | 0.4 |
| Zinc-Barium Phosphate | 19.2 |
| Zinc Salt of a substituted Benzoic Acid (Sicorin RZ) | 1.9 |
| Aluminum Triphosphate | 15.3 |
| Surface Active Agents | 0.2 |
| Solvents | 29.6 |

| EXAMPLE 4 | |
| --- | --- |
| Ingredients | Parts by Weight |
| Epoxy Resin | 31.6 |
| Titanium dioxide | 24.5 |
| Titanium dioxide vesiculated beads | 0.0 |
| Zinc-barium phosphate | 4.8 |
| Zinc salt of a substituted benzoic acid (Sicorin RZ) | 0.5 |
| Aluminum Triphosphate | 7.4 |
| Surface active agents | 0.2 |
| Organic Solvents | 31.2 |

| EXAMPLE 5 | |
| --- | --- |
| Ingredients | Parts by Weight |
| Epoxy Resin | 21.5 |
| Titanium dioxide | 11.7 |
| Titanium dioxide vesiculated beads | 0.4 |
| Zinc-barium phosphate | 18.0 |
| Zinc salt of a substituted benzoic acid (Sicorin RZ) | 1.8 |
| Aluminum Triphosphate | 18.4 |
| Surface active agents | 0.2 |
| Organic Solvents | 28.0 |

| EXAMPLE 6 | |
| --- | --- |
| Ingredients | Parts by Weight |
| Epoxy Resin | 26.5 |
| Titanium dioxide | 10.8 |
| Titanium dioxide vesiculated beads | 1.1 |
| Zinc-barium phosphate | 18.0 |
| Zinc salt of a substituted benzoic acid (Sicorin RZ) | 1.8 |
| Aluminum Triphosphate | 11.1 |
| Surface active agents | 0.2 |
| Organic Solvents | 30.5 |

The epoxy resin and specifically EPON-1513 is derived from the reaction of epichlorohydrin and an alcohol such as a substituted dicyclohexanol. The coatings prepared in accordance with this invention may comprise a combination of the epoxy resin and a polyamide resin together with a mixture of the pigments as disclosed in the examples. The coatings were subjected to corrosion resistance test and found to be resistant to corrosion for periods ranging up to 500 hours in a SO2-Salt Fog Test and up to 1,000 hours in the Salt Fog Test.

Preferably, the coatings are prepared by mixing all of the ingredients, and then milling the mixture to a fineness of about 5 for camouflage and 7 for high gloss colors on the Hegman scale according to ASTM D1210. The coating is applied on the substrate at thickness ranging from about 0.001 to 0.004 inches, e.g., up to about 10 mils preferably 1 to 4 mils. The coating may be applied by various methods including spraying, rolling, or brushing onto the surface depending on the viscosity. The viscosity of the coating for the particular application may be achieved by adjusting the content of the solvent within the ranges specified herein and by the selection of the particular reactants used to form the epoxy resin binder. After the coating is applied to the surface, the solvent is evaporated at room or elevated temperatures and the coating is allowed to cure to a film thickness having the desired properties. The pigments can be introduced into the coating by first forming a mill base. The mill base can be formed, for example, by conventional sand-grinding or ball-milling techniques, and then blended, by simple stirring or agitation with the other ingredients of the composition.

It was unexpected that the specific combination of the aluminum triphosphate, zinc salt of benzoic acid, e.g. zinc benzoate and an alkaline earth metal phosphate, e.g., zinc or zinc-barium phosphates, improved the corrosion resistance while retaining all the other desirable characteristics required of a coating. In other words, the specific combination of the aluminum triphosphate, zinc salts of substituted benzoic acid and zinc or zinc-barium phosphates, in the ratios stated, improved the corrosion inhibition substantially when compared to the use of either one of these metal compounds alone in the same coating.

For purposes of this invention, the term epoxy resin can be any resin or a mixture thereof having two or more epoxy groups and combinations of epoxy resins with other resins such as the modified-urethanes, polyamides and the like. The most common are produced by the reaction of an epoxide with polyhydric phenols or alcohols to produce the polyglycidyl ethers. Resins of this type include the diglycidyl ethers of bisphenol-A; glycidyl ethers of glycerol; and glycidyl ethers of long-chain bisphenols. These epoxy resins are commercially available under such tradenames as Araldite, by Ciba Company, Inc. and Epon, by Shell Chemical Company. Some commercial resins are derived from the reaction of phenols with epihalohydrins and particularly epichlorohydrin. These resins have molecular weights in the range of 300–10,000. Some of these resins are disclosed in U.S. Pat. Nos. 2,467,171; 2,581,464; 2,582,985 and 2,615,007, the disclosures of which are incorporated herein by reference. Included are the cyclic and aliphatic epoxy resins which do not contain the phenolic structure associated with the more conventional epoxy resins.

More specifically, the epoxy resins and the modified epoxy resins including mixtures thereof may be defined as containing at least two epoxy groups where the groups are terminal or internal. The polyglycidyl compounds, for example, contain a plurality of 1–2 epoxide groups derived from the reaction of a polyfunctional active hydrogen-containing compound with an excess of an epihalohydrin. When the active hydrogen compound is a polyhydric alcohol or phenol, the resulting epoxide contains glycidyl ether groups. The preferred polyglycidyl compounds are derived by the condensation of 2,2-bis(4-hydroxyphenyl)propane, i.e. bisphenol-A. Specific bisphenol-A epoxy resins are available commercially under trade names such as "EPON 1513", "EPON 828", "EPON 1001", and "EPON 1009" from Shell Chemical Co., and as "DER 330", DER 331", and "DER 332" from Dow Chemical Co.

Other suitable polyepoxides can be prepared from polyols such a pentaerythritol, glycerol, butanediol or trimethylol propane and an epihalohydrin. In a preferred embodiment, the organic binder comprise an epoxy resin derived from the condensation of bisphenol-A and epichlorohydrin. These epoxy resins include, for example, the bisphenol-A epichlorohydrin condensation products which have average molecular weights ranging from about 1,000 to 500,000. These resins include the polyol-epoxy resins comprising alkylene oxides; the polyolefin epoxy resins comprising epoxypolybutadiene; the epoxy polyester resins comprising units of epoxyacrylates; the epoxyurethane resins comprising urethane groups and the polyhydroxypolyether, polyhydroxypolyether-ester or polyhydroxypolyester epoxy resins derived from the glycidyl etherified or glycidyl esterified polyvalent carboxylic acids.

The urethane-modified epoxy resins may have average molecular weights ranging from 1,000 to 20,000, while the polyol epoxy resins have average molecular weights of 6,000 to 60,000. These resins are prepared from epichlorohydrin, bisphenol-A and dibasic acids. Specific epoxy resins include the epoxypolyester, polyhydroxypolyether, polyhydroxypolyether-ester and polyhydroxypolyester epoxy resins. These resins may be used alone or with other resins such as the phenolic resins, melamine resins or urethane resins to improve the various characteristics of the coating. The urethane-modified epoxide resins, for example, exhibit comparatively strong adhesion.

In general, the epoxy resins are in solution at concentrations of 40 to 100% solids by weight. Various solvents may be used in preparing the coating including xylene, toluene, mineral terpenes, methyl ethyl ketone, methyl isobutyl ketone, ethyl cellosolve, butyl cellosolve, cellosolve acetate, ethyl acetate, butyl acetate, methyl isobutyl carbinol, isopropanol, n-butanol, cyclohexanone or mixtures thereof with various paint solvents in any proportion. Usually, the content of the volatile components i.e. solvents in the coating composition of this invention ranges from about 0 to 50% e.g., 15–35% by weight of the total composition. The amount of solvent may vary depending on the viscosity and method of application of the coating onto the substrate.

A specific epoxy binder comprises epoxy resins characterized by the presence of at least two epoxy groups, in combination with an amine curing agent. These epoxy resins are normally liquids or have a low molecular weight and are soluble in various aliphatic solvents such as ketones, esters, ether alcohols or any of the aromatic solvents such as xylene, etc. Amine curing agents include the aliphatic and aromatic amines, and in particular the tertiary amines, $C_2$–$C_{30}$, preferably $C_2$–$C_{10}$ polyamines, polyamides, and amine adducts. The preferred curing agents are the $C_2$–$C_{10}$ polyamines that contain two or more reactive hydrogen groups and amine-terminated polyamide compositions, including those formed through the condensation of unsaturated fatty acids with $C_2$–$C_{10}$ aliphatic polyamines having at least three amino groups per molecule. Examples of amine curing agents include triethylene tetramine, m-phenylenediamine, 3-diethylamino-1-propylamine, Versamid 100, 115, 125, 150 and 1540 resins, ethylene diamine, m-xylylene diamine, 3,3'-iminobispropylamine, tetraethylene pentamine, etc. Sufficient amounts of the amine curing agent are employed to assure substantial crosslinking of the epoxide resin. Generally stoichiometric amounts or slight excess of the epoxy resin are employed.

The coating composition may also contain ultraviolet light stabilizers, antioxidants, catalysts, wetting agents, dispersing or surface active agents, e.g., Anti-Terra-204 (carboxylic acid salts of polyamine-amides), flow modifiers e.g. BYK-320 (polyether modified methylalkyl polysiloxane copolymers), adhesion promoters, etc. The ultraviolet light stabilizer can be present in an amount of 1–10% by weight, based on the weight of the epoxy binder. The antioxidants can be present also in amounts of 0.1–3% by weight of the binder. Ultraviolet light stabilizers include benzophenones, triazoles, triazines, benzoates, substituted benzenes, organophosphorous sulfides, etc.

The coating composition of this invention may contain about 0.01–2.0% by weight, based on the weight of the resin of a curing catalyst. The catalysts are usually organo metallics such as dibutyl tin dilaurate and zinc octoate, tin di-2-ethylhexoate, stannous octoate, stannous oleate, zinc naphthenate, vanadium acetyl acetonate, and zirconium acetyl acetonate.

The coating can be applied to a variety of substrates by conventional application methods such a spraying, dipping, brushing, or flow coating. Substrates that can be coated with the composition are, for example, metal, wood, glass, or plastics such as polypropylene, polystyrene, and the like. The coating is particularly suited for application over pretreated or unprimed metal and can be cured at ambient temperatures or heated at 40°–120° C.

The solvent includes a mixture of solvents, e.g., benzene, toluene, xylene, and naphtha. Ester solvents include the acetates, e.g., ethyl acetate, butyl acetate, hexyl acetate, amyl acetate, etc., propionates such as ethyl propionate, butyl propionate, etc. Ketone solvents include acetone, methyl-ethyl ketone, methyl-isopropyl ketone, methyl-isobutyl ketone, diethyl ketone, cyclohexanone, etc. Glycol ester solvents include ethylene glycol, monoethyl-ether acetate, etc.

The preferred alkaline earth metal or zinc phosphates used in preparing the coating composition is a zinc-barium phosphate. The preferred zinc salt of benzoic acid is specifically characterized as having at least one hydroxyl group and nitro ($NO_2$) substituent and molecular weights of about 100–500, e.g. 300, density of about 2–3 grams per mililiter and a specific surface area of $16M^2$/gram. The benzoic acid salts are commercial products obtained from BASF and identified as Sicorin-RZ.

The aluminum triphosphate may be characterized as follows and more specifically in Table I.

ALUMINUM TRIPHOSPHATE
$AlH_2P_3O_{10}·2H_2O$

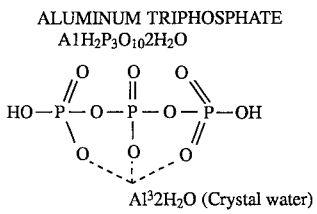

$Al^3·2H_2O$ (Crystal water)

TABLE I

| Substance | Components | TSCA No. |
|---|---|---|
| K-WHITE NO. 82 | $AlH_2P_3O_{10}·2H_2O$ | 13939 - 25 - 8 |
| K-WHITE No. 84 | $SiO_2$ | 7631 - 86 - 9 |
|  | ZnO | 1314 - 13 - 2 |
| K-White NO. 105 | $AlH_2P_3O_{10}·2H_2O$ | 13939 - 25 - 8 |
|  | ZnO | 1314 - 13 - 2 |
| K-BOND NO. 80 | $AlH_2P_3O_{10}·2H_2O$ | 13939 - 25 - 8 |
|  | $SiO_2$ | 7631 - 86 - 9 |
| K-FRESH NO. 100 | $AlH_2P_3O_{10}·2H_2O$ | 13939 - 25 - 8 |
| K-BOND NO. 90 | $Al(PO_3)_3$ | 13776 - 88 - 0 |
|  | $SiO_2$ | 7631 - 86 - 9 |

In testing the coatings prepared in accordance with this invention, the corrosion protection was found to be over 1000 hours in 5% salt spray in accordance with ASTM Test Method B-117 and over 500 hours in $SO_2$/salt spray in accordance with ASTM Test Method G-85. The coating was found to have outstanding performance when exposed to extreme heat conditions, high intensity of light and water, extreme cold conditions, hot lubricating oils and other chemicals normally found in aircraft operations. By utilizing the coating composition of this invention, a corrosion resistant film can be obtained on various substrates. The coating therefore has properties which function as a primer and more important as a single topcoat which is highly adherent, flexible, chemical resistant and resistant to all weather conditions. The coatings lower the risk of failure due to cracking, especially at low temperatures and are easily touched-up since only one coating need be applied. Since the coating requires only one coat, it requires less time for application and removal and thereby saves on manpower that would generally be needed in the preparation of a two coat system. Moreover, the present coating provides protection at lower film thicknesses thereby reducing the weight of the coating compared to a two-coat paint system which is an important factor when considering aircraft coatings.

It is obvious that there are other variations and modifications which can be made without departing from the spirit and scope of the invention as particularly set forth in the appendant claims.

The invention claimed:

1. A corrosion-resistant self-priming coating comprising from about 15 to 50 parts by weight of an epoxy resin binder, 1 to 30 parts by weight of an alkaline earth metal phosphate, 0.1 to 5 parts by weight of a zinc benzoate, 1 to 25 parts weight of an aluminum triphosphate, 1 to 30 parts by weight of titanium dioxide, 0 to 2.0 parts by weight of an oil soluble surface active agent and 0 to 50 parts by weight of at least one organic solvent.

2. The coating of claim 1 wherein the epoxy binder ranges from about 20 to 40 parts by weight, titanium dioxide ranges from about 5 to 25 parts by weight, alkaline earth metal phosphate ranges from about 5 to 25 parts by weight, zinc benzoate ranges from about 0.5 to 2.0 parts by weight, aluminum triphosphate from about 5 to 20 parts by weight, the surface active agent ranges from 0.1 to 0.5 parts by weight and the solvent ranges from about 15 to 35 parts by weight.

3. The coating of claim 2 wherein 0 to about 100 percent by weight of the total amount of titanium dioxide is in the form of vesiculated beads.

4. The coating of claim 2 wherein 0 to 10 percent by weight of the total amount of titanium dioxide is in the form of vesiculated beads.

5. The coating of claim 2 wherein the zinc benzoate is a salt of a substituted benzoic acid having one hydroxyl group and one nitro group.

6. The coating of claim 3 wherein the metal phosphate is a zinc-barium phosphate.

7. The coating of claim 3 wherein the metal phosphate is zinc phosphate.

8. A process of preparing a corrosion-resistant self-priming epoxy coating on a substrate which comprises forming the coating by applying onto the substrate an organic solution comprising from about 15 to 50 parts by weight of an epoxy resin binder, 1 to 30 parts by weight of an alkaline-earth metal phosphate, 0.1 to 5.0 parts by weight of a zinc benzoate, 1 to 25 parts by weight of an aluminum triphosphate, 1 to 30 parts by weight of a titanium dioxide pigment, 0 to 2.0 parts by weight of a surface active agent and 0 to 50 percent by weight of at least one organic solvent.

9. The process of claim 8 wherein the metal phosphate is a zinc-barium phosphate.

10. The process of claim 8 wherein the metal phosphate is zinc phosphate.

* * * * *